United States Patent
Fujitani

(10) Patent No.: US 11,449,228 B2
(45) Date of Patent: Sep. 20, 2022

(54) RECORDING CONTROL APPARATUS AND CONTROL METHOD THEREOF

(71) Applicant: CANON KABUSHIKI KAISHA, Tokyo (JP)

(72) Inventor: Yohei Fujitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 16/534,833

(22) Filed: Aug. 7, 2019

(65) Prior Publication Data

US 2020/0073585 A1 Mar. 5, 2020

(30) Foreign Application Priority Data

Aug. 30, 2018 (JP) .............................. JP2018-161162

(51) Int. Cl.
G06F 3/06 (2006.01)

(52) U.S. Cl.
CPC .......... G06F 3/0608 (2013.01); G06F 3/0604 (2013.01); G06F 3/0644 (2013.01); G06F 3/0655 (2013.01); G06F 3/0659 (2013.01); G06F 3/0673 (2013.01); G06F 3/0679 (2013.01)

(58) Field of Classification Search
CPC .. G06F 12/0246; G06F 3/0679; G06F 3/0604; G06F 3/0608; G06F 3/0616; G06F 3/0644; G06F 3/0655; G06F 3/0632; G06F 3/0673; G06F 3/0659; G06F 3/0674; G06F 3/0676; G06F 3/0677; G11C 16/20
See application file for complete search history.

(56) References Cited

U.S. PATENT DOCUMENTS 4,644,494 A * 2/1987 Muller ................... G11C 16/06
711/152
9,507,717 B1 * 11/2016 Busaba ................. G06F 3/0604
(Continued)

FOREIGN PATENT DOCUMENTS

| CN | 1790528 A | 6/2006 |
| CN | 1910557 A | 2/2007 |

(Continued)

OTHER PUBLICATIONS

EEPROM Emulation Driver for XC2000/XE166 by Infineon (Year: 2012).*
NAND Flash Controller by Intel (Year: 2014).*

*Primary Examiner* — Paul M Knight
(74) *Attorney, Agent, or Firm* — Canon U.S.A., Inc. IP Division

(57) ABSTRACT

A recording control apparatus that records data on a recording medium includes a position recording unit configured to perform control so that, upon completion of recording of data, a recording start position for next recording of data is recorded on the recording medium, an initialization unit configured to initialize the recording medium, and a control unit configured to perform control in such a manner that in a case where the initialization unit executes first initialization processing, the first initialization processing and clear processing for clearing the recording start position recorded on the recording medium are executed, and in a case where the initialization unit executes second initialization processing, the second initialization processing is executed without executing the clear processing.

15 Claims, 7 Drawing Sheets

(56) References Cited

U.S. PATENT DOCUMENTS

| | | |
|---|---|---|
| 2006/0120692 A1 | 6/2006 | Fukuta |
| 2007/0014215 A1 | 1/2007 | Tanabe |
| 2007/0050535 A1* | 3/2007 | Nelson ................ G06F 12/0246 |
| | | 711/103 |
| 2007/0065118 A1 | 3/2007 | Chen |
| 2007/0109921 A1 | 5/2007 | Watabe et al. |
| 2013/0145083 A1* | 6/2013 | Suzuki .................... G06F 21/79 |
| | | 711/103 |
| 2017/0351428 A1* | 12/2017 | Liu ...................... G06F 16/1847 |
| 2019/0369911 A1* | 12/2019 | Rai ........................ G06F 3/0679 |

FOREIGN PATENT DOCUMENTS

| | | |
|---|---|---|
| CN | 1937065 A | 3/2007 |
| CN | 104583973 A | 4/2015 |
| JP | 2010020845 A | 1/2010 |

* cited by examiner

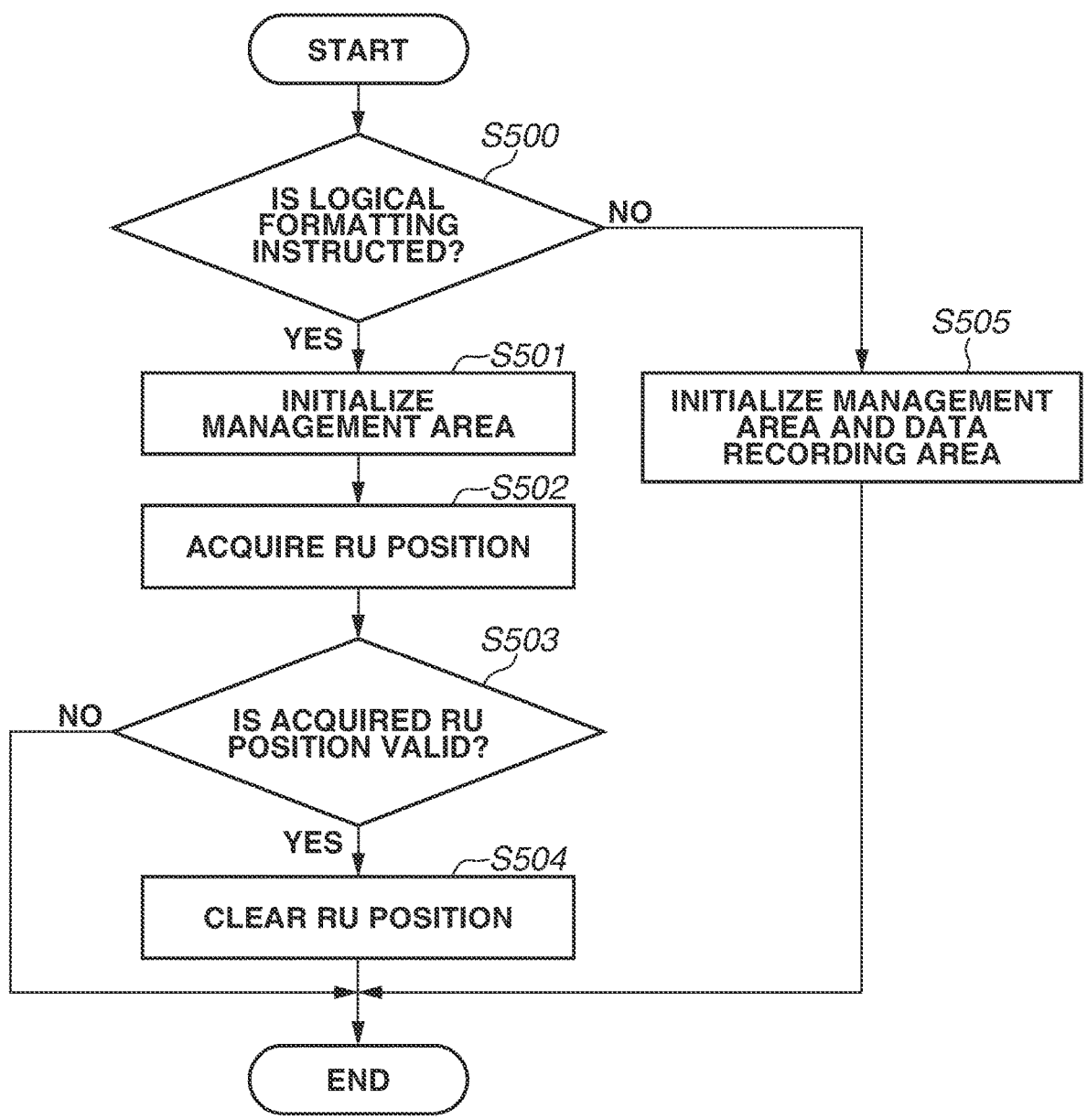

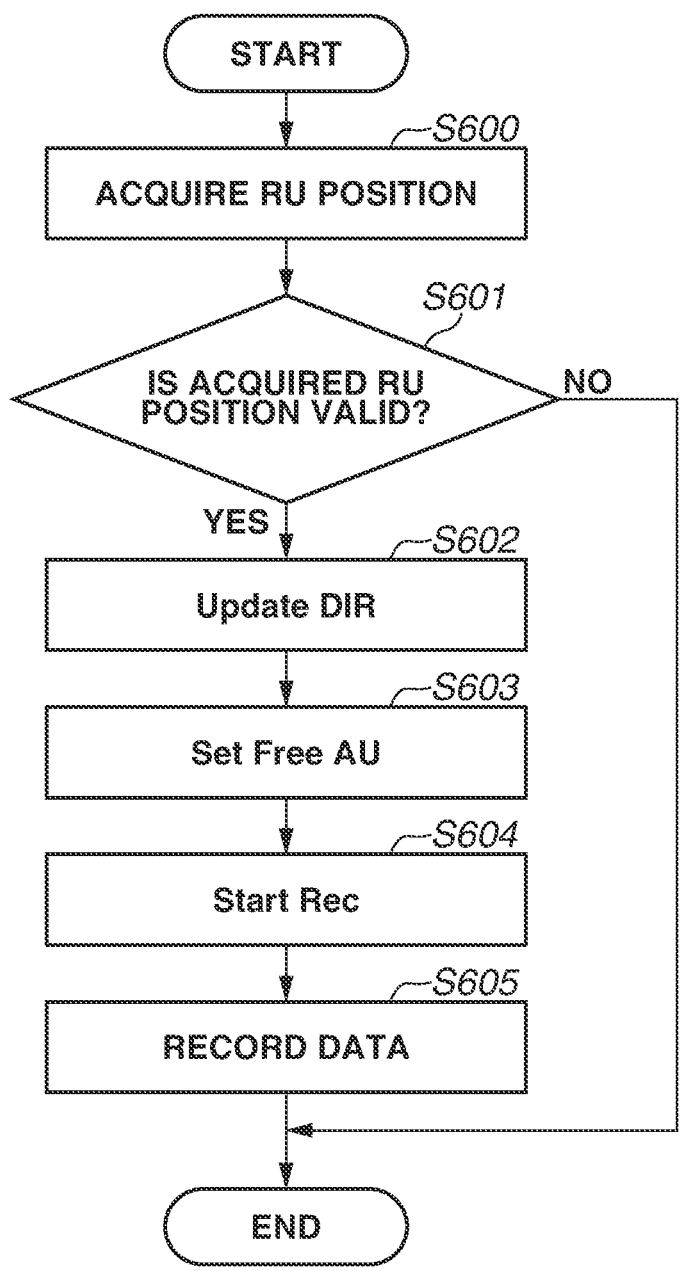

RECORDING CONTROL APPARATUS AND CONTROL METHOD THEREOF

BACKGROUND OF THE INVENTION

Field of the Invention

The present invention relates to a recording control apparatus that controls recording on a recording medium.

Description of the Related Art

Recording apparatuses, such as a digital camera and a digital video camera, which record moving images, still images, audio data, and the like on recording media are known. Data is managed as a file by a file system such as File Allocation Table (FAT)16, FAT32, or extended FAT (exFAT).

Some recording media support a plurality of writing methods with different writing speeds. Each recording apparatus can use different writing methods depending on the type of data to be recorded, the necessity of real-time recording, or the like. For example, a method is known in which a recording area is divided into a plurality of areas (each of the areas is also referred to as an allocation unit (AU)), and data is continuously recorded from the head of a free AU in high-speed writing and data is recorded on a free area in each AU in normal writing.

The above-described technique is discussed in, for example, "SD Specifications Part 1, Physical Layer, Simplified Specification, Version 5.00", Technical Committee, SD Card Association (URL:https://www.sdcard.org/downloads/pls/pdf/
index.php?p=Part1_Physical_Layer_Simplified_
Specification_Ver5.10.jpg&f=Part1_Physical_Layer_
Simplified_Specification_Ver5.10.pdf&e=EN_P1500).

In this technique, the characteristics of recording media that a time required for recording data on a free area in an AU on which data is partially recorded is longer than a time required for recording data on a free AU (AU on which no data is recorded) are taken into consideration.

In other words, a recording apparatus issues an instruction to a recording medium by using an AU as a recording unit, which contributes to obtaining a maximum speed of the recording medium.

A concept called "speed class" is proposed by applying this characteristic. The speed class is such a concept that a recording medium guarantees a minimum speed for a recording apparatus by setting constraints on the recording apparatus to search for a free AU and use each recording unit (RU) obtained by newly dividing the AU by utilizing the characteristics of the AU. According to this concept, for example, it is possible to provide a remarkably effective configuration for data control in which there is a possibility that recording of a moving image may be finally interrupted if real-time recording, such as recording of a moving image, cannot be executed.

In addition, a video speed class is proposed as a broader concept of the speed class. The video speed class is such a concept that a higher-speed performance can be guaranteed by setting a further constraint on the recording apparatus. Specifically, it is defined that the maximum size of each AU is 512 MB, which is eight times as large as that in the related art and a recording apparatus declares AUs to be used in advance to a recording medium by using a new command called "Set Free AU". Further, commands called "Suspend AU" and "Resume AU", which are used to hold an RU position included in an AU in the recording medium and resume recording from the RU position held in the recording medium, are added. If such constraints are satisfied, higher-speed recording can be guaranteed for the amount of data that is three times as much as that in the speed class of the related art.

Furthermore, in the video speed class, a concept called multi-stream writing is also introduced. In the speed class of the related art, higher-speed recording can be guaranteed only for single-stream data recording. However, in the current video speed class, even when a plurality of files is simultaneously recorded on one recording medium, the recording can be guaranteed, although the files are recorded in a time sharing format.

SUMMARY OF THE INVENTION

The present invention is directed to performing appropriate initialization processing on a recording medium on which a recording resume position can be recorded.

According to an aspect of the present invention, there is provided a recording control apparatus that records data on a recording medium, the recording control apparatus including a position recording unit configured to perform control so that, upon completion of recording of data, a recording start position for next recording of data is recorded on the recording medium, an initialization unit configured to initialize the recording medium, and a control unit configured to perform control in such a manner that in a case where the initialization unit executes first initialization processing, the first initialization processing and clear processing for clearing the recording start position recorded on the recording medium are executed.

Further features of the present invention will become apparent from the following description of exemplary embodiments with reference to the attached drawings.

BRIEF DESCRIPTION OF THE DRAWINGS

FIG. 5 is a flowchart illustrating formatting processing.

FIG. 6 is a flowchart illustrating clear processing according to a modified example.

DESCRIPTION OF THE EMBODIMENTS

Preferred exemplary embodiments of the present invention will be described in detail below with reference to the drawings.

Exemplary embodiments of the present invention will be described in detail below with reference to the accompanying drawings.

The present exemplary embodiment illustrates an example in which the present invention is applied to an image capturing apparatus as typified by a lens-interchangeable single-lens reflex type digital still camera as an example of a recording control apparatus. However, the present invention is also applicable to an apparatus for recording data on a recording medium, such as a digital video camera, and devices such as a smartphone including an image capturing function. It is to be understood that an application to a digital still camera is merely an example. The present invention is also applicable to a case where images captured by an image capturing device including an image capturing function are recorded on a processing apparatus capable of communicating with the image capturing device.

<Configuration of Image Capturing Apparatus>

Figure 1:
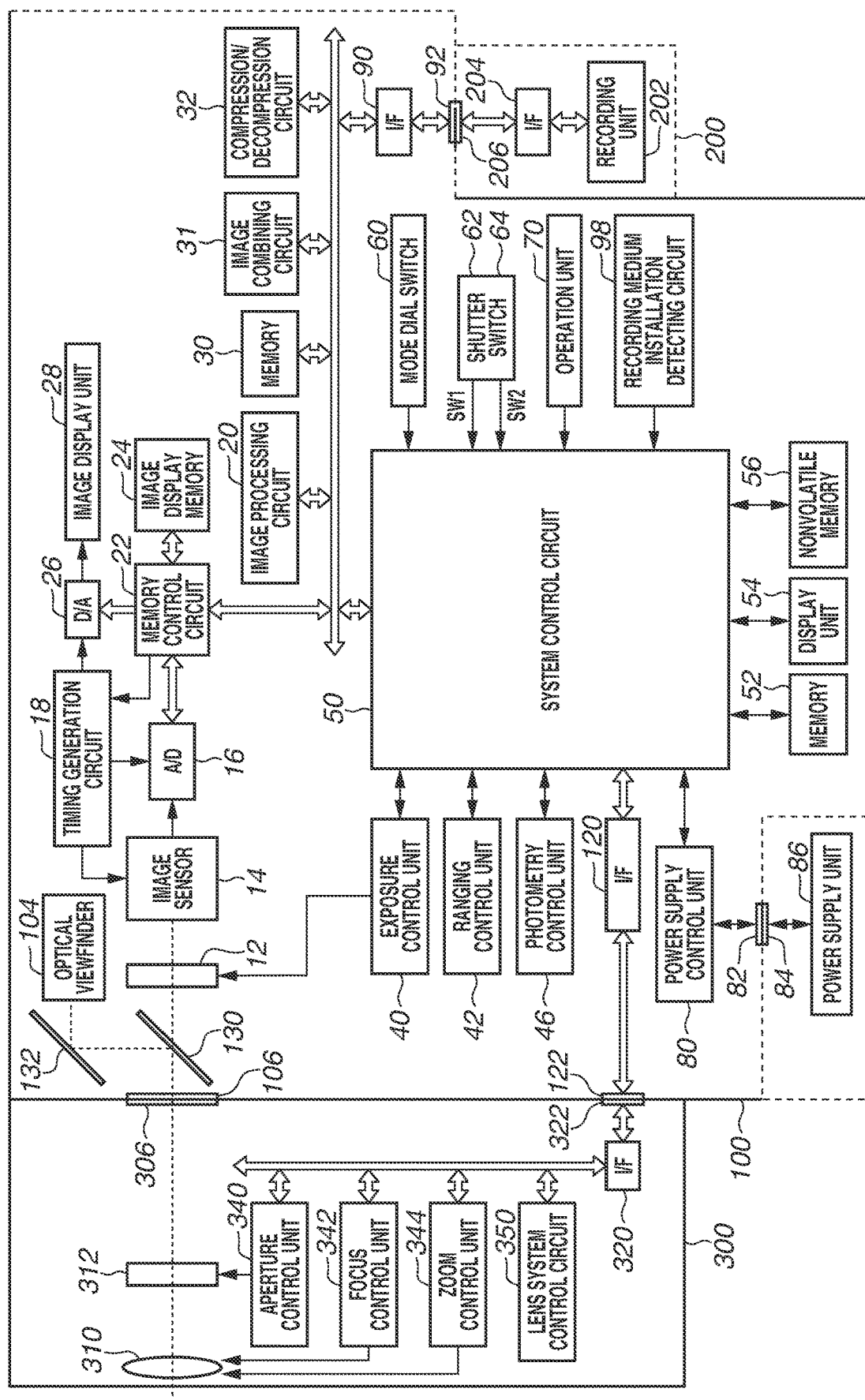
FIG. 1 is a block diagram illustrating an image capturing apparatus as an example of a recording control apparatus according to an exemplary embodiment of the present invention.

FIG. 1 is a block diagram illustrating an image capturing apparatus according to an exemplary embodiment of the present invention. As illustrated in FIG. 1, the image capturing apparatus includes a camera body 100 and an interchangeable lens type lens unit 300.

The lens unit 300 includes an image capturing lens 310 which includes a plurality of lenses, an aperture 312, and a lens mount 306 which mechanically couples the lens unit 300 with the camera body 100. The lens mount 306 includes various functions for electrically connecting the lens unit 300 to the camera body 100. The lens mount 306 includes an interface (I/F) 320 that connects the lens unit 300 to the camera body 100, and a connector 322 that electrically connects the lens unit 300 to the camera body 100.

The connector 322 also includes a function for exchanging a control signal, a state signal, a data signal, and the like between the camera body 100 and the lens unit 300, and supplying currents at various voltages. The connector 322 may be configured to perform communication not only by electrical communication, but also by optical communication, audio communication, and the like.

The lens unit 300 also includes an aperture control unit 340, a focus control unit 342, a zoom control unit 344, and a lens system control circuit 350. The aperture control unit 340 controls the aperture 312 in cooperation with an exposure control unit 40, which controls a shutter 12 of the camera body 100 as described below, based on photometry information supplied from a photometry control unit 46 of the camera body 100. The focus control unit 342 controls focusing of the image capturing lens 310. The zoom control unit 344 controls zooming of the image capturing lens 310. The lens system control circuit 350 controls the overall operation of the lens unit 300. The lens system control circuit 350 includes a memory 52 that temporarily stores constants, variables, programs, and the like for operations. The lens system control circuit 350 also includes a nonvolatile memory 56 that holds identification information, such as the number unique to the lens unit 300, management information, functional information such as a maximum aperture value, a minimum aperture value, and a focal length, current and previous setting values, programs for operations, and the like.

Next, the configuration of the camera body 100 will be described. The camera body 100 includes a lens mount 106 that mechanically couples the camera body 100 with the lens unit 300. A light beam incident through the lens unit 300 is reflected by mirrors 130 and 132 and is then guided to an optical viewfinder 104. The mirror 130 may be configured as a quick-return mirror or a half mirror. The camera body 100 is provided with the focal-plane shutter 12 and an image sensor 14. The image sensor 14 is a charge-coupled device (CCD) sensor or a complementary metal-oxide semiconductor (CMOS) sensor, and photoelectrically converts an object image.

A light beam incident on the image capturing lens 310 is guided through the aperture 312, which functions as a light amount limitation unit by a single-lens reflex method, the lens mounts 306 and 106, the mirror 130, and the shutter 12, and is focused as an optical image on the image sensor 14.

An analog-to-digital (A/D) converter 16 convers an analog signal (output signal) output from the image sensor 14 into a digital signal. A timing generation circuit 18 supplies clock signals and control signals to the image sensor 14, the A/D converter 16, and a digital-to-analog (D/A) converter 26, and is controlled by a memory control circuit 22 and a system control circuit 50.

An image processing circuit 20 performs predetermined pixel interpolation processing and color conversion processing on the data output from the A/D converter 16 or the data output from the memory control circuit 22. The image processing circuit 20 performs, as needed, predetermined arithmetic processing using image data output from the A/D converter 16. Based on the obtained arithmetic processing result, the system control circuit 50 can perform autofocus (AF) processing, automatic exposure (AE) processing, and flash preliminary light emission (EF) processing by a contrast detection method, to control the exposure control unit 40 and a ranging control unit 42. Further, the image processing circuit 20 performs predetermined arithmetic processing using the image data output from the A/D converter 16, and also performs through-the-lens (TTL) automatic white balance (AWB) processing based on the obtained arithmetic processing result.

The memory control circuit 22 controls the A/D converter 16, the timing generation circuit 18, the image processing circuit 20, an image display memory 24, the D/A converter 26, a memory 30, and a compression/decompression circuit 32. The image data output from the A/D converter 16 is written into the image display memory 24 or the memory 30 through the image processing circuit 20 and the memory control circuit 22, or through only the memory control circuit 22.

Image data for display that is stored in the image display memory 24 is converted into an analog signal by the D/A converter 26 and is then supplied to an image display unit 28 and displayed on the image display unit 28. The image display unit 28 is, for example, a thin-film transistor (TFT) liquid crystal display (LCD). Captured image data is sequentially displayed on the image display unit 28, thereby making it possible to achieve an electronic viewfinder (EVF) function. Further, the image display unit 28 can optionally turn on/off the display in response to an instruction from the system control circuit 50. When the display is turned off, power consumption in the camera body 100 can be significantly reduced.

The memory 30 is a memory for storing captured still images or moving images. The memory 30 has a storage capacity sufficient to store a predetermined number of still images or a predetermined amount of moving image. This enables writing of a large volume of images into the memory 30 at high speeds even in the case of continuous shooting and panoramic shooting in which a plurality of still images is continuously captured. In addition, at the time of capturing a moving image, the memory 30 is used as a frame buffer for images continuously written at a predetermined rate. The memory 30 can also be used as a work area for the system control circuit 50.

An image combining circuit 31 combines a plurality of images to generate one combined image. Accordingly, the image combining circuit 31 simultaneously reads a plurality of pieces of image data written in the memory 30 and performs combining processing in the circuit to write the generated combined image data in the memory 30. Examples of image data to be combined include image data that is converted by the A/D converter 16 and written by the memory control circuit 22 and image data that is processed by the image processing circuit 20.

The compression/decompression circuit 32 compresses (encodes) or decompresses (decodes) the image data using a known compression method. The compression/decompression circuit 32 reads the images stored in the memory 30 and performs compression processing or decompression processing on the images, and writes the processed data again into the memory 30. The compression/decompression circuit 32 also includes a function for compression-encoding moving image data in a predetermined format, or decompressing moving image signals from predetermined compression-encoded data.

The exposure control unit 40 controls the shutter 12 in cooperation with the aperture control unit 340 that controls the aperture 312 based on the photometry information supplied from the photometry control unit 46. The ranging control unit 42 performs AF processing. The ranging control unit 42 causes the light beam incident on the image capturing lens 310 in the lens unit 300 to be incident by the single-lens reflex method through the aperture 312, the lens mounts 306 and 106, the mirror 130, and a focus adjustment sub-mirror (not illustrated), and measures an in-focus state of an image formed as an optical image.

The photometry control unit 46 performs AE processing. The photometry control unit 46 causes the light beam incident on the image capturing lens 310 in the lens unit 300 to be incident by the single-lens reflex method through the aperture 312, the lens mounts 306 and 106, the mirror 130, and a photometry sub-mirror (not illustrated), and measures an exposure state of an image formed as an optical image.

Further, the photometry control unit 46 may perform AF control using the measurement result obtained by the ranging control unit 42 and the arithmetic processing result obtained by subjecting the image data output from the A/D converter 16 to arithmetic processing by the image processing circuit 20. In addition, exposure control may be performed using the measurement result obtained by the photometry control unit 46 and the arithmetic processing result obtained by subjecting the image data output from the A/D converter 16 to arithmetic processing by the image processing circuit 20.

The system control circuit 50 controls the overall operation of the camera body 100, and includes a known central processing unit (CPU) or the like. The nonvolatile memory 56 stores programs and the like to be executed by the CPU of the system control circuit 50. The system control circuit 50 executes control processing or arithmetic processing on each unit in the image capturing apparatus, recording control processing for recording data on a recording medium 200, and the like based on programs read from the nonvolatile memory 56.

A display unit 54 functions as a notification unit that sends a notification, such as an operation state and a message, to an external apparatus, by using characters, images, audio, or the like, in response to the execution of programs by the system control circuit 50. Examples of the display unit 54 include not only a visual display, such as an LCD or a light-emitting diode (LED), but also a sounding element that sends an audio notification. The display unit 54 is installed in one or more areas that are located in the vicinity of an operation unit 70 of the camera body 100 and can be easily observed. Some of the functions of the display unit 54 are installed in the optical viewfinder 104.

Examples of display contents of the display unit 54 to be displayed on an image display unit, such as an LCD, include display contents associated with an image capturing mode, such as a single-shooting/continuous-shooting display and a self-timer display, display contents associated with recording, such as a compression ratio display, a number-of-recording-pixels display, a number-of-recorded-images display, and a number-of-recordable-images display, and display contents associated with image capturing conditions, such as a shutter speed display, an aperture value display, an exposure correction display, a dimmer correction display, a display of the amount of light emission of external flash, and a red-eye-reduction display. Examples of the display contents also include a macro shooting display, a beep setting display, a remaining battery level display, an error display, an information display by multi-digit numbers, and a display of an installation state of the recording medium 200. Examples of the display contents also include a display of an installation state of the lens unit 300, a display of a communication I/F operation, a date/time display, and a display indicating a connection state with an external computer.

Examples of the display contents of the display unit 54 to be displayed in the optical viewfinder 104 include an in-focus display, an image capturing preparation completion display, a camera shake warning display, a flash charging display, a flash charging completion display, a shutter speed display, an aperture value display, an exposure correction display, and a recording medium writing operation display.

The nonvolatile memory 56 is an electrically erasable/recordable storage medium storing programs and the like to be described below. For example, an electrically erasable programmable read-only memory (EEPROM) can be used as the nonvolatile memory 56.

A mode dial switch 60, a shutter switch 62 (SW1), a shutter switch 64 (SW2), and the operation unit 70 are operation units used to input various operation instructions for the system control circuit 50. Each of the operation units includes one or a combination of a switch, a dial, a touch panel, a pointing device by viewpoint detection, an audio recognition device, and the like. These operation units will now be described in detail.

The mode dial switch 60 enables a user of the image capturing apparatus to switch functional image capturing modes. Examples of the image capturing modes include an automatic image capturing mode, a program image capturing mode, a shutter speed priority image capturing mode, an aperture priority image capturing mode, a manual image capturing mode, and a focal depth priority (depth) image capturing mode. Examples of the image capturing modes also include a portrait image capturing mode, a landscape image capturing mode, a macro image capturing mode, a sports image capturing mode, a nightscape image capturing mode, and a panoramic image capturing mode.

The shutter switch 62 (SW1) is turned on during an operation (e.g., half-pressing) of a shutter button (not illustrated), and functions as a switch for instructing to start an operation such as AF processing, AE processing, AWB processing, or EF processing.

The shutter switch 64 (SW2) is turned on when the operation of the shutter button (not illustrated) is completed (e.g., full-pressed), and functions as a switch for instructing to start an operation of a series of processing including exposure processing, development processing, and recording processing. First, in the exposure processing, a signal read from the image sensor 14 is written into the memory 30 as image data through the A/D converter 16 and the memory control circuit 22. Further, the image data is subjected to development processing using arithmetic processing by the image processing circuit 20 and the memory control circuit 22. In the recording processing, the image data is read from the memory 30 and is compressed by the compression/decompression circuit 32 and is then written into the recording medium 200.

The operation unit 70 is composed of various buttons, a touch panel, or the like. For example, the operation unit 70 includes a live-view start/stop button, a moving image recording start/stop button, a menu button, a set button, a multi-screen reproduction page-break button, a flash setting button, a single-shooting/continuous-shooting/self-timer switch button, and a menu movement plus (+)/minus (−) button. The operation unit 70 also includes a playback image movement plus (+) button, a playback image movement minus (−) button, a captured image quality selection button, an exposure correction button, a dimmer correction button, an external flash emission light amount setting button, and a date/time setting button. The functions of the plus and minus buttons described above may include rotary dial switches to enable easier selection of numeric values and functions.

Further, the operation unit 70 includes an image display ON/OFF switch for setting ON/OFF of the image display unit 28, and a quick review ON/OFF switch for setting a quick review function to automatically reproduce image data obtained after image capturing. The operation unit 70 also includes a compression mode switch for selecting a compression ratio by Joint Photographic Experts Group (JPEG) compression or selecting a RAW mode in which a signal supplied from the image sensor 14 is directly digitized and recorded on the recording medium 200. The operation unit 70 also includes an AF mode setting switch for setting a one-shot AF mode and a servo AF mode. In the one-shot AF mode, the AF operation is started when the shutter switch 62 (SW1) is pressed, and when an in-focus state is obtained once, the in-focus state is maintained. In the servo AF mode, the AF operation is continuously performed while the first shutter switch 62 (SW1) is being pressed.

A power supply control unit 80 includes a battery detection circuit, a direct current (DC)-DC converter, a switch circuit for switching blocks to be energized, and the like. The power supply control unit 80 detects whether batteries are attached, the type of the batteries, and the remaining battery level, controls the DC-DC converter based on the detection result and the instruction from the system control circuit 50, and supplies a necessary voltage to the units including the recording medium 200 for a necessary period.

The camera body 100 also includes connectors 82 and 84 and a power supply unit 86. The power supply unit 86 includes a primary battery such as an alkaline battery or a lithium battery, a secondary battery such as a nickel-cadmium (NiCd) battery, a nickel metal hydride (NiMH) battery, a lithium-ion (Li-ion) battery, or a Li-polymer battery, an alternating current (AC) adapter, or the like.

An I/F 90 is an interface for connecting the recording medium 200, such as a memory card, a hard disk, or a personal computer (PC), and the camera body 100. A connector 92 is used to connect the recording medium 200, such as a memory card or a hard disk, or a PC. A recording medium installation detecting circuit 98 detects whether the recording medium 200 is attached to the connector 92. The I/F 90 and the connector 92 can be configured in conformity with various known storage media standards. For example, the I/F 90 and the connector 92 can be a Personal Computer Memory Card International Association (PCMCIA) card, a compact Flash® (CF) card, or a secure digital (SD) card. When the I/F 90 and the connector 92 are configured in conformity with the standards, such as a PCMCIA card, a CF card, and the like, various communication cards can be connected. Examples of the communication cards include a local area network (LAN) card, a modem card, a universal serial bus (USB) card, and an Institute of Electrical and Electronic Engineers (IEEE) 1394 card. Examples of the communication cards also include a P1284 card, a Small Computer System Interface (SCSI) card, and a personal handy-phone system (PHS) card. Connecting the various communication cards enables exchanging image data and management information attached to the image data with peripheral devices such as other computers and printers.

The optical viewfinder 104 can guide the light beam incident on the image capturing lens 310 by the single-lens reflex method through the aperture 312, the lens mounts 306 and 106, and the mirrors 130 and 132, and allow the user to view the light beam as an optical image. This enables performing image capturing using only the optical viewfinder 104 without the use of the EVF function of the image display unit 28. The optical viewfinder 104 is also used as a function of the display unit 54 to provide, for example, indications for an in-focus state, camera shake warning, flash charging, a shutter speed, an aperture value, and exposure correction.

An I/F 120 is an interface for electrically connecting the camera body 100 to the lens unit 300 in the lens mount 106. A connector 122 electrically connects the camera body 100 to the lens unit 300. A lens installation detecting unit (not illustrated) detects whether the lens unit 300 is attached to the lens mount 106 and the connector 122. The connector 122 also includes a function for exchanging a control signal, a state signal, a data signal, and the like between the camera body 100 and the lens unit 300, and supplying currents at various voltages. The connector 122 may be configured to perform communication not only by electrical communication, but also by optical communication or audio communication.

In the present exemplary embodiment, a memory card is used as the recording medium 200. The recording medium 200 includes a recording unit 202, which includes a semiconductor memory, an I/F unit 204 for connecting with the camera body 100, and a connector 206 for connecting with the camera body 100.

The configuration of the image capturing apparatus including the camera body 100 and the lens unit 300 according to the exemplary embodiment has been described above.

<Recording Medium 200>

In the present exemplary embodiment, assume that a memory card (SD card) compatible with SD standards by SD Card Association is used as the recording medium 200. Data is recorded by a writing method (speed class writing) in conformity with speed class specifications in SD standards. The speed class specifications are specifications that guarantee a minimum speed for continuously recording data on a recording medium.

In speed class writing, a recording area (user area) is managed for each allocation unit (AU). Each AU includes a plurality of recording units (RUs). The size of each RU varies depending on the type of a card (SD Standard Capacity (SDSC) card, SD High-Capacity (SDHC) card, or SD Extended Capacity (SDXC) card), or the type of a speed class. In the current specifications, the size of each RU is a multiple of 16 KB, and the maximum size of each RU is 512 KB. Each RU includes a size corresponding to an integral multiple of a cluster (minimum management unit) of a recording medium. Speed class writing is performed only on a free AU on which no data is recorded (i.e., an AU including no RU on which data is recorded). On the other hand, an AU including an RU on which data is recorded is referred to as a fragmented AU.

The present exemplary embodiment is also applicable to a recording apparatus that uses a recording medium of other specifications that support writing methods with different management units for recording areas. An example of the recording medium is a CF card. In the CF card, Video Performance Guarantee (VPG) is determined as a writing method to guarantee a minimum recording speed.

<Speed Class Writing for Recording Medium 200>

Figure 2A:
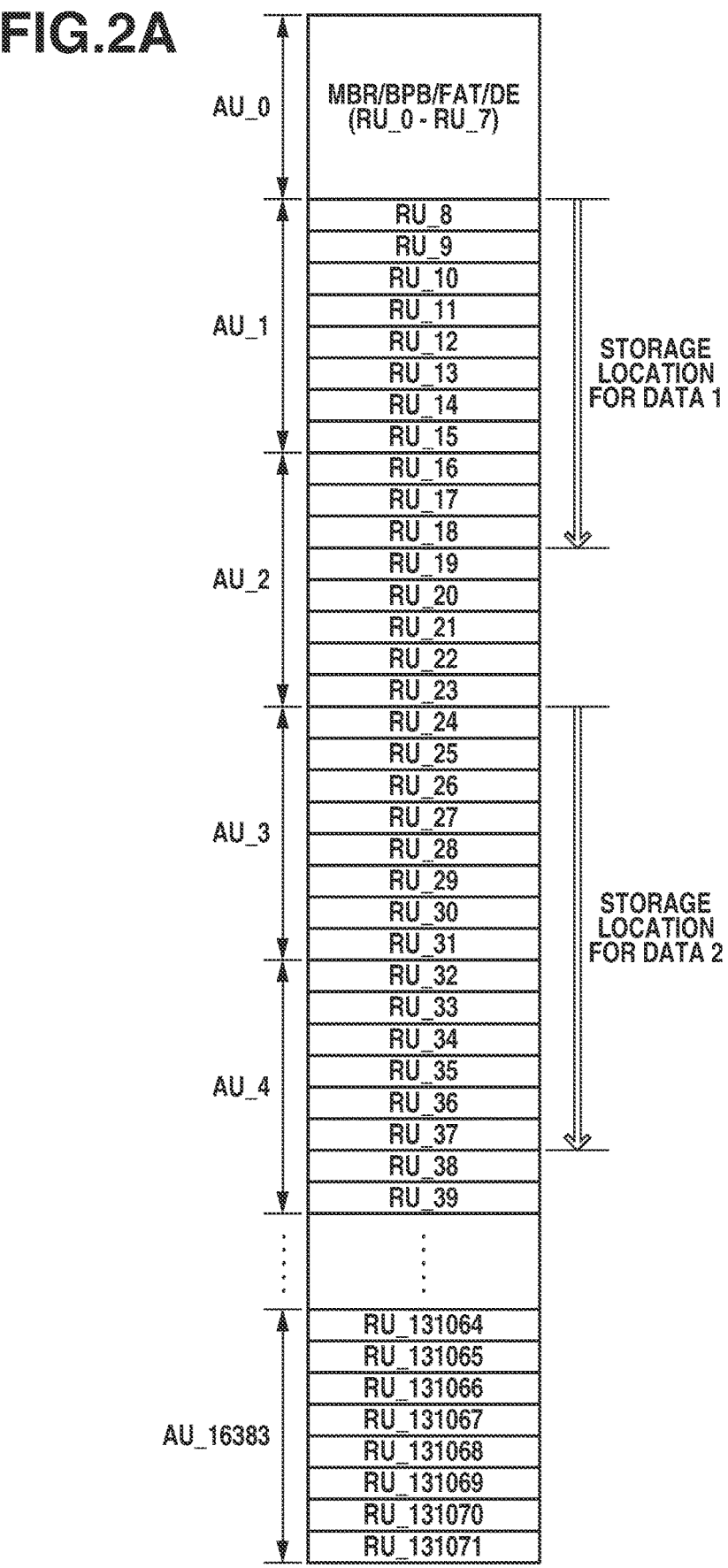
FIGS. 2A and 2B each illustrate an example of a logical address map in a recording medium.
Figure 2B:
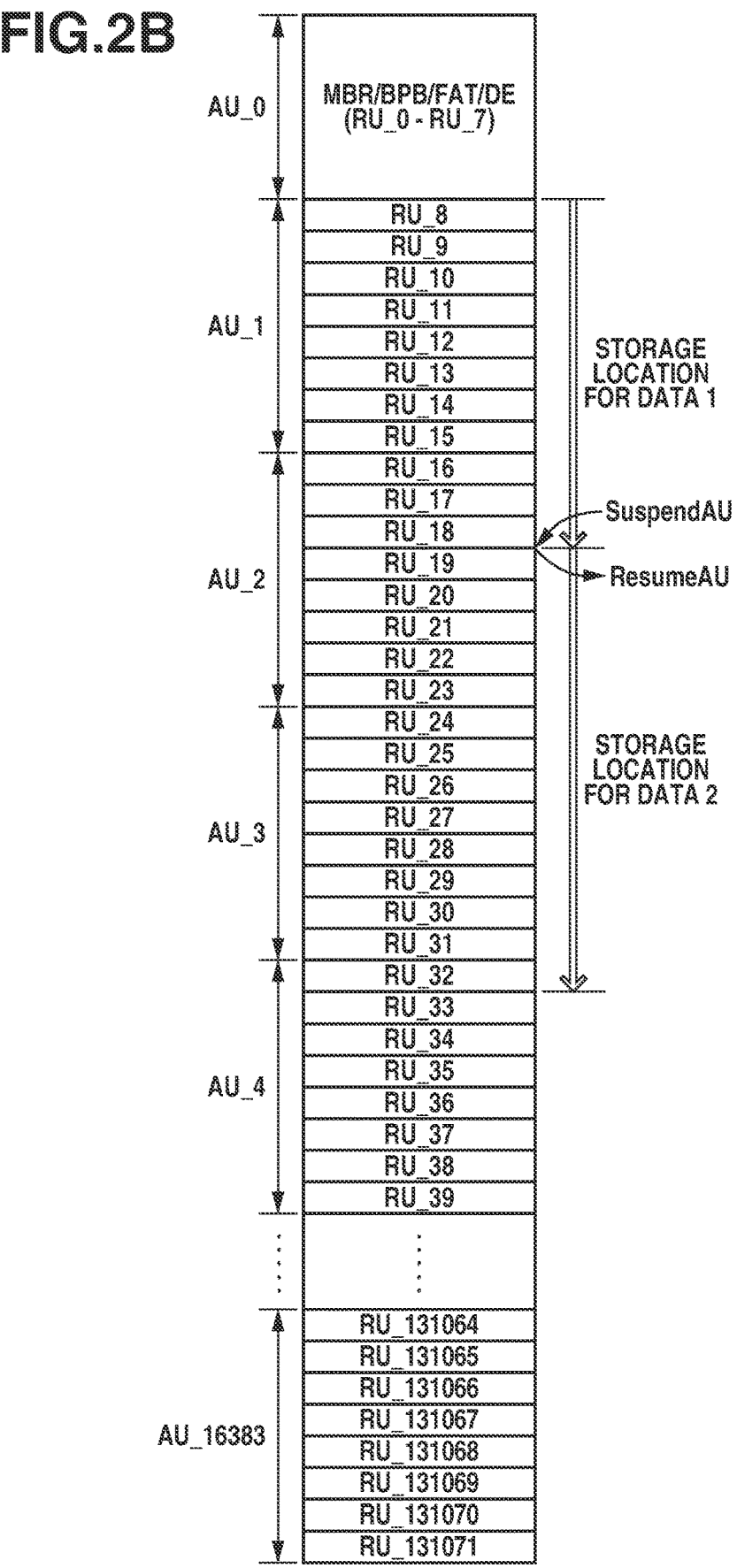

First, FIGS. 2A and 2B will be described. FIGS. 2A and 2B each schematically illustrate a logical address map including concepts of AU and RU of the recording unit 202 in the recording medium 200. The number of RUs and the number of AUs vary depending on each type of the recording medium 200. In the present exemplary embodiment, the recording unit 202 in the recording medium 200 includes 131072 RUs, i.e., the 0th RU (RU_0) to the 131071st RU (RU_131071). Also assume that each AU includes eight RUs, and 16384 AUs, i.e., the 0th AU (AU_0) to the 16383rd AU (AU_16383), are included.

The AU_0 (RU_0 to RU_7) is used as a management area, and system information is recorded on the management area. Examples of the system information include Master Boot Record (MBR), Basic Input/Output System (BIOS) Parameter Block (BPB), File Allocation Table (FAT), and Directory Entry (DE). However, the system information is not limited to these examples. The system information illustrated as examples in the present exemplary embodiment are known, and thus detailed descriptions thereof are omitted. Further, AU_1 to AU_16383 (RU_8 to RU_131071) are used as data recording areas for recording data.

Referring to FIGS. 2A and 2B, differences between the method of using each RU in each AU during speed class writing in the related art and single stream writing which is a typical method of using a video speed class (hereinafter referred to as VSC) will be described.

First, an RU use sequence in the speed class of the related art illustrated in FIG. 2A will be described. First, a free AU in which data is not logically recorded on all RUs is searched. This is because, by utilizing the characteristics of each AU of a recording medium, as described above, the performance of the recording medium is maximized by writing data into a free AU, to thereby achieve high-speed writing. Next, a write instruction is issued for each RU for the searched free AU, and data is written in size units of RU. After data is written into all RUs in the AU on which data is being written, a subsequent free AU is searched and data is written into the AU for each RU in the same manner as described above. The data recording is sequentially carried out by repeating the above-described processes, and then writing of data into a first file (DATA1) is completed. The data writing is finished without any operation such as issuance of any special command. Next, when data is written into a second file (DATA2), a free AU is searched again and data is written into the searched free AU for each RU in the same manner as in the control for writing data into the first file. In this case, no issue arises if writing of the data (DATA1) in the first file ends in the AU unit (last RU in the AU). Meanwhile, if writing of the data does not end in the AU unit, i.e., writing of the data ends in an RU other than the last RU in the AU, the AU includes a remaining RU in which no data is written. The remaining RU in the AU is an area that cannot be used as a speed class area in the related art, and thus cannot be used for writing of data into the second file.

Next, the method of using each RU during writing of data in a VSC single stream will be described with reference to FIG. 2B. First, for the first file (DATA1), like in the speed class of the related art, a free AU is searched and data is written into the free AU for each RU. In this case, however, before writing data for each RU, a Set Free AU command is issued to declare free AUs to be used in advance to the recording medium 200. In this Set Free AU command, a plurality of AUs is designated in advance. In the Set Free AU command, eight AUs can be designated in advance. In the VSC, writing data into a location other than the AUs designated by the Set Free AU command violates the constraints of the VSC, so that the data recording speed cannot be guaranteed.

Declaring free AUs to be used in the Set Free AU command makes it possible for the recording medium 200 to invalidate data that may be written previously in the location and to shift to a continuous writing mode. Accordingly, an advantageous effect of preventing garbage collection due to the fragmentation of the recording medium 200 can be obtained. However, since only eight AUs can be designated in advance in the Set Free AU command, in the case of using more than eight AUs, there is a need to issue the Set Free AU command again. The Set Free AU command is disadvantageous in that a command overhead of 250 ms at maximum occurs and the recording apparatus cannot access the recording medium 200 during the occurrence of the command head.

In a single stream of the VSC, the recording apparatus accesses the recording medium 200 and writes data into the recording medium 200 by using a combination of the Set Free AU command and the write instruction for each RU. The single stream writing greatly differs from the speed class of the related art in regard to a control operation to be performed when writing of data into the first and subsequent files (DATA1) is finished and a control operation to be performed when writing of data into the second and subsequent files (DATA2) is started. Specifically, a Suspend AU command is issued when recording of data on the first and subsequent files is finished, and a Resume AU command is issued when recording of data on the second and subsequent files is started. The Suspend AU command is a command for storing, into the recording medium 200, information about the position of a free RU subsequent to the RU on which data is already recorded by the write instruction previously issued. Specifically, the position of a subsequent free RU on which data is subsequently written is stored in the recording medium 200. The Resume AU command is a command for starting data recording in the VSC not from an AU start position, but from the RU position stored in the recording medium 200 by the Suspend AU command, i.e., the RU position in the AU. The information about the RU position is stored in the recording medium 200 and thus is held even when the power supply of the recording medium 200 is turned off or on. In addition, the use of a command, such as ACMD 13, enables the image capturing apparatus to acquire, from the recording medium 200, the information about the RU position held in the recording medium 200.

For example, as illustrated in FIG. 2B, when the Suspend AU command is issued after writing of DATA1 is finished, positional information of RU_19 is held as RU positional information to be used for the next recording start position in the recording medium 200. In other words, the RU position is recorded as the next recording start position on the recording medium 200. Then, the Resume AU command is issued before writing of DATA2 is started, thereby enabling writing of DATA2 from the position RU_19.

Thus, the use of the Suspend AU command and the Resume AU command enables writing of data from the remaining RU included in the AU. Accordingly, a plurality of files can be recorded on a number of successive RUs in one AU, without generating any remaining RUs.

Next, the concept of multi-stream writing in the VSC will be described (for detailed information, see "SD Specifications part 1, Physical Layer, Simplified Specification, Version 5.00", Technical Committee, SD Card Association). Commands for multi-stream writing in the VSC, i.e., Update DIR and Release Dir commands, will now be described in detail.

First, in the recording control method using the speed class of the related art, a sector corresponding to a DE on a file system of a generated file is issued to the recording medium 200 through a command called "Update DIR", and the sector is registered in the recording medium 200. By registering the sector in advance, a deterioration in speed due to a special control operation on the sector in which a random access destination is registered can be minimized if the recording medium 200 is randomly accessed. After that, the Set Free AU command and the like are executed, and then "Start Rec", which is a recording start command, is called to start recording of data on the recording medium 200. When recording of the data (file) is finished, a special command is not issued.

Next, a control method for multi-stream writing in the VSC will be described. First, a sector corresponding to a DE of a file that is generated in the same manner as in the related art is registered by the Update DIR command. Then, after the Set Free AU command and the like are executed, the Start Rec command or the like is executed to start controlling of the VSC. After that, a new file is generated, and data recording to which the VSC is applied can also be performed on the generated file in parallel with the file previously generated. However, if the remaining capacity of the sector registered by the Update DIR command is small, DE information about a new image file cannot be added to the registered sector. If the information cannot be added, there is a need to issue a new Update DIR command to register the sector on which the DE information is recorded in the recording medium 200. According to the specifications, up to eight sectors can be registered at once in the VSC by the Update DIR command. After recording of the DE of the file on the registered sectors is completed, the Release Dir command to be paired with the Update DIR command is issued to release the setting of the registered sectors. When the number of issued Release Dir commands is equal to the number of issued Update DIR commands, the VSC is automatically finished.

Further, the multi-stream writing in the VSC has constraints not only on the issuance of commands, but also on the location where data is written. In the multi-stream writing, time sharing is performed to guarantee a minimum speed for a plurality of files, instead of guaranteeing a speed class for each file. More specifically, there is a need to write data in continuous areas. For example, in the case of writing data with a size of 64 MB in a file 1 into an AU of 512 MB, data in a file 2 needs to be written into continuous areas after the area of 64 MB in the data of 512 MB in which the file 1 is written, instead of writing the data into the subsequent AU. If this constraint is not satisfied, the VSC cannot be guaranteed, and therefore there is a need to release the VSC and issue the Start Rec command again.

In a case where a plurality of files is recorded on the same AU, if one of the files is erased, the available space for non-speed classes is increased by the amount corresponding to the erased file. However, this causes an adverse effect that the available space for the speed class in which a free AU is required is not increased.

Thus, the control operations for the RU using method and the file control method in the speed class of the related art are different from those in the VSC. Therefore, the minimum speed to be guaranteed in the VSC increases threefold. Furthermore, it is possible to use the available space more effectively and newly perform multi-stream writing.

<Configuration of Recording Medium 200>

Figure 3:
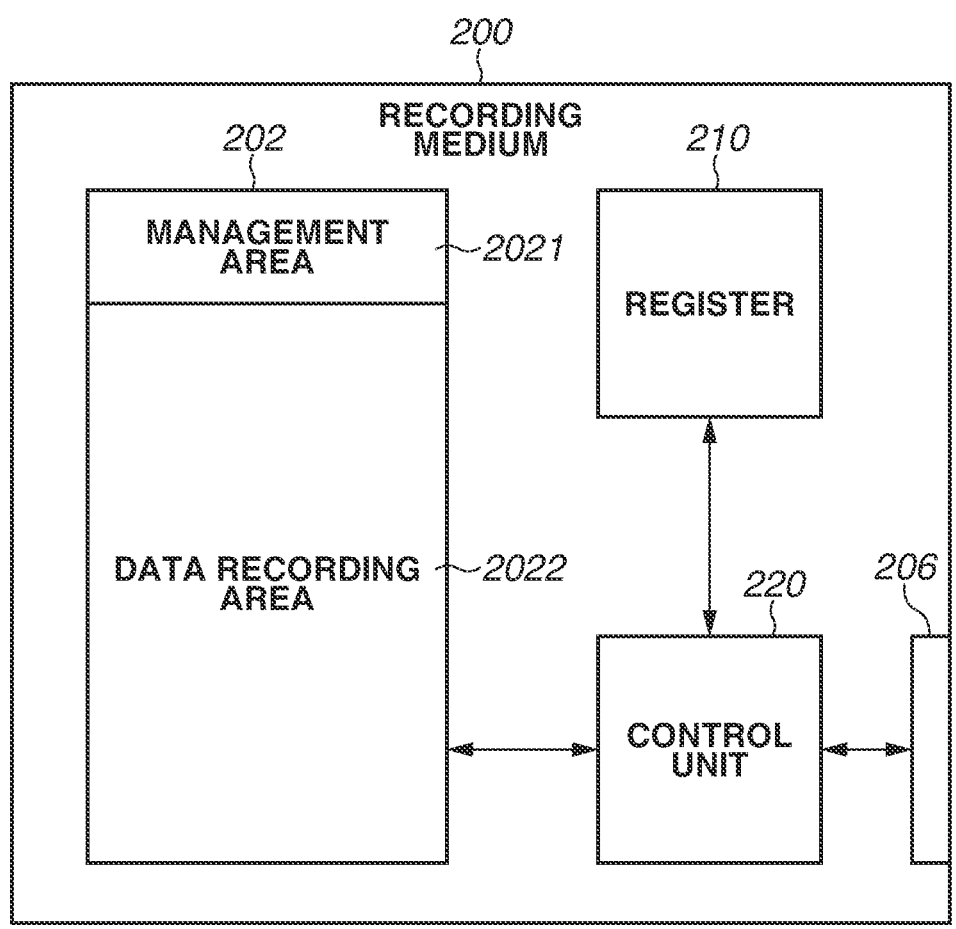
FIG. 3 illustrates a configuration of the recording medium.

FIG. 3 illustrates the configuration of the recording medium 200 that is compatible with the VSC control.

The recording medium 200 is provided with the recording unit (memory) 202 for storing data, a register 210 for register storage, and a control unit 220. The recording unit 202 for storing data corresponds to the recording unit 202 illustrated in FIGS. 2A and 2B, and is managed by logical addresses illustrated in FIGS. 2A and 2B. As described above, the recording unit 202 includes a management area 2021 and a data recording area 2022. The recording medium 200 includes the register 210 which is a nonvolatile memory for register storage and is provided separately from the recording unit 202. Management information, such as an identification (ID) for the recording medium 200, status information, and the like are also recorded on the register 210. Positional information about the RU for resuming recording is also recorded on the register 210. The control unit 220 controls, for example, recording and reading of data on and from the recording medium 200, and transmission and reception of data to or from an external apparatus to be connected through the connector 206. Specifically, recording and reading of data on and from the recording unit 202, recording and reading of data on and from the register 210, and transmission of data through the connector 206 are performed in response to a command or data received through the connector 206. For example, upon receiving the Suspend AU command, the control unit 220 records information about the position of each RU on the register 210. Upon receiving the ACMD 13 from the external apparatus (image capturing apparatus), the control unit 220 reads out the information that is recorded on the register 210 and includes the position of the RU as the next recording start position, and transmits the read information to the external apparatus (image capturing apparatus) through the connector 206. Upon receiving the Resume AU command from the external apparatus, the control unit 220 controls data recording to be started from the RU position recorded on the register 210, i.e., from the position of the RU in the AU.

<Write Processing Based on VSC>

Figure 4:
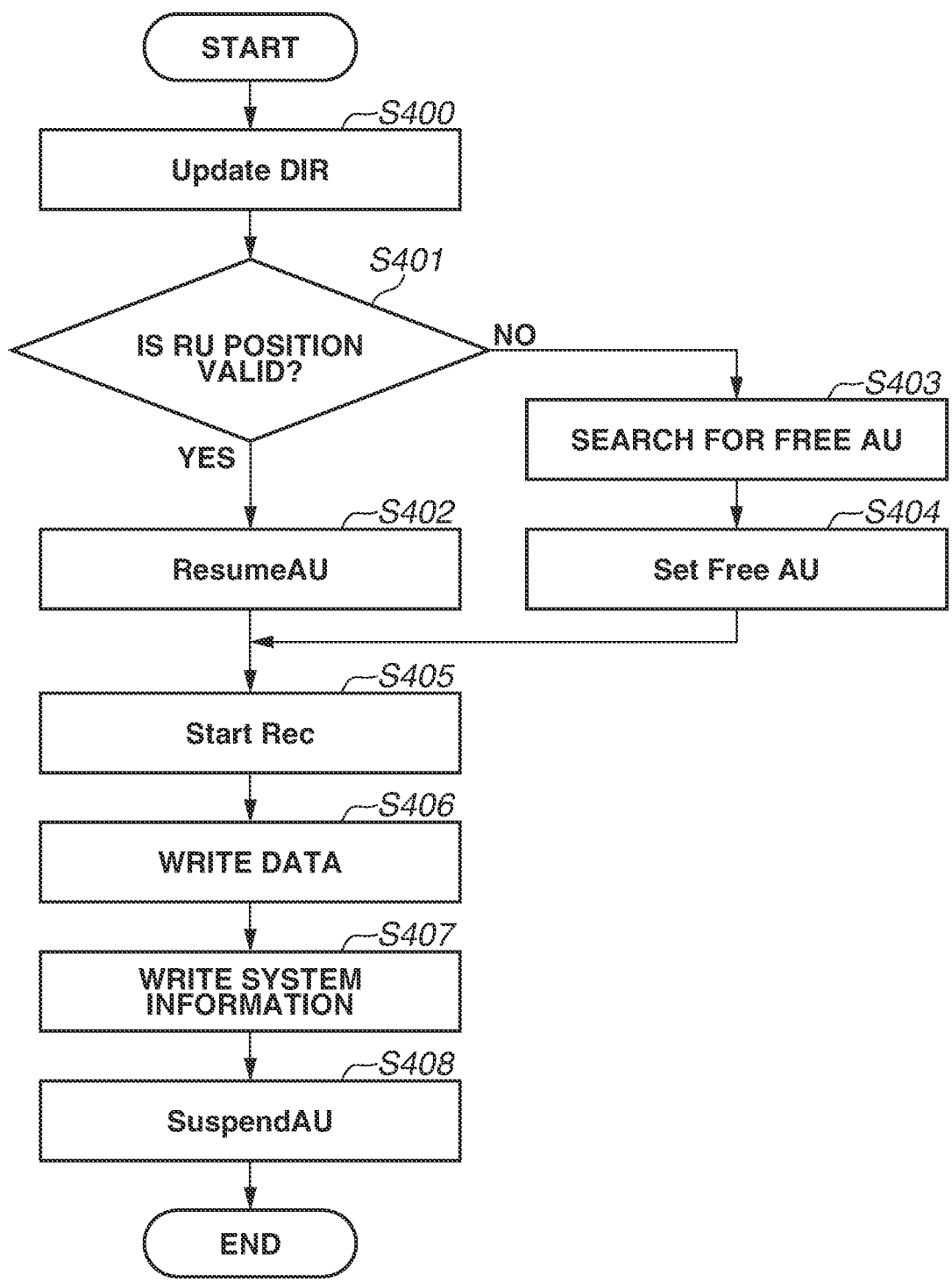
FIG. 4 is a flowchart illustrating a writing method based on a video speed class.

Processing to be performed on the recording medium 200 by the image capturing apparatus to achieve writing processing based on the VSC will be described. FIG. 4 is a flowchart illustrating writing processing based on the VSC.

The flowchart illustrated in FIG. 4 is implemented in such a manner that the system control circuit 50 of the image capturing apparatus reads a program according to an aspect of the present invention stored in the nonvolatile memory 56 into the memory 52, and performs arithmetic processing and controls each unit based on the read program.

First, in step S400, the system control circuit 50 issues the Update DIR command to the recording medium 200, and registers the sector of the management area on which the DE is recorded in the recording medium 200.

Next, in step S401, the system control circuit 50 determines whether the RU position held in the recording medium 200 is valid. Information held in the register 210 of the recording medium 200 can be acquired in such a manner that the system control circuit 50 transmits the command called the ACMD 13 to the recording medium 200. Thus, the information about the RU position can be acquired from the recording medium 200 by using the ACMD 13. The information about the RU position may be acquired at a timing when the recording medium 200 is attached and connected to the image capturing apparatus, or the information about the RU position may be held in the memory 52. More alternatively, the information about the RU position may be acquired in step S401. In step S401, when the RU position acquired from the recording medium 200 indicates "0", or a value indicating the RU position that exceeds the range of the data recording area 2022, the system control circuit 50 determines that the RU position is not valid. The determination as to whether the RU position is not valid may be made by a method other than the above-described method. If it is determined that the RU position is not valid (NO in step S401), the processing proceeds to step S403. If it is determined that the RU position is valid (YES in step S401), the processing proceeds to step S402.

In step S402, the system control circuit 50 issues the Resume AU command to the recording medium 200 to start recording from the RU position held in the recording medium 200.

In step S403, the system control circuit 50 searches for a free AU in the data recording area 2022 of the recording medium 200. Then, in step S404, the system control circuit 50 issues the Set Free AU command to the recording medium 200 to register the position of the free AU searched in step S403, and starts recording of data from the registered free AU.

Next, in step S405, the system control circuit 50 issues the Start Rec command to the recording medium 200 so as to execute writing of data in the VSC.

After that, in step S406, the system control circuit 50 executes writing of data into the data recording area 2022 of the recording medium 200. In the data writing processing, data is recorded on the recording medium 200 by using a write command. If the size of data to be recorded is large, the data is divided into a plurality of pieces of data, and a series of data in one file is recorded a plurality of times by using write commands. In this flowchart, descriptions of file open processing, file close processing, and the like to be performed during recording of data are omitted.

Next, in step S407, the system control circuit 50 writes the system information (DE information or the like) corresponding to the data recorded in step S405 into the sector that is registered in step S400 and corresponds to the management area 2021 of the recording medium 200.

After completion of recording of the data and system information, in step S408, the system control circuit 50 issues the Suspend AU command. The issued Suspend AU command is transmitted to the recording medium 200, thereby registering information about the RU position in the AU obtained after the data is written into the data recording area 2022 in the register 210 of the recording medium 200 as described above. Accordingly, when the subsequent writing operation is started, data recording can be started from the RU position.

Thus, after completion of data recording, data is written to the RU position in the AU (i.e., the recording start position where the subsequent data recording operation is performed), which is stored in the recording medium 200, by using the Suspend AU command, thereby making it possible to effectively execute data writing using each AU also in the VSC.

<Formatting Processing for Recording Medium 200>

Next, formatting processing (initialization processing) for the recording medium 200 will be described.

In the case of executing physical formatting for initializing a data area as well as system information, the RU position in the AU held by the Suspend AU command as the next recording start position is erased and changed to an invalid value (0). On the other hand, in the case of executing logical formatting for formatting the recording medium 200 at a high speed by initializing only the system information, the RU position in the AU held by the Suspend AU command as the next recording start position cannot be erased in some cases. In this case, if writing in the VSC is performed after logical formatting, the RU position that is not erased and remains after formatting is acquired. If writing is started using the RU position that is not erased and remains, writing is started from the RU in a free AU and a free area is generated, so that the capacity of the area is wasted.

Accordingly, in the present exemplary embodiment, the recording start position recorded on the recording medium 200 is reliably erased regardless of the type of initialization processing, and thus the following formatting processing is executed.

The formatting processing for the recording medium 200 is executed when the operation unit 70 of the image capturing apparatus is operated by the user and the execution of formatting of the recording medium 200 is instructed. When formatting of the recording medium 200 is instructed by a user operation, formatting processing (initialization processing) illustrated in FIG. 5 is executed. In the case of executing the formatting processing, the system control circuit 50 interrupts the processing of recording or reading of data on or from the recording medium 200 and then executes the formatting processing and resumes the interrupted processing after completion of the formatting processing. The formatting processing will be described with reference to FIG. 5. A flowchart illustrated in FIG. 5 is implemented in such a manner that the system control circuit 50 of the image capturing apparatus reads a program according to an aspect of the present invention stored in the nonvolatile memory 56 into the memory 52, and performs arithmetic processing and controls each unit based on the read program.

The formatting processing will be described below with reference to FIG. 5.

First, in step S500, the system control circuit 50 determines which one of "logical formatting" and "physical formatting" is instructed. Examples of the formatting processing include "logical formatting" for initializing only the system information in the recording medium 200 and "physical formatting" for initializing the system information and the data area of the recording medium 200. The user can select one of logical formatting and physical formatting to be executed by operating the operation unit 70 when the user instructs the formatting processing. If it is determined that "logical formatting" is instructed (YES in step S500), the processing proceeds to step S501. If it is determined that "physical formatting" is instructed (NO in step S500), the processing proceeds to step S505.

In step S501, the system control circuit 50 initializes the system information in the management area 2021 of the recording medium 200. In initializing the management area 2021, system information, such as MBR, BPB, FAT, or DE, is created based on a predetermined format parameter. The created system information is recorded on the management area 2021 of the recording medium 200, and the system information recorded on the management area 2021 is updated with an initial state.

In the case of logical formatting, only the management area 2021 is initialized and information about the RU position is held in the register 210. Accordingly, the processing of steps S502 to S504 is executed and processing for clearing the RU position is executed.

In step S502, the system control circuit 50 transmits the ACMD 13 to the recording medium 200, and acquires information about the RU position held in the register 210 of the recording medium 200. In step S503, the system control circuit 50 determines whether the RU position acquired in step S502 is valid. This determination method is similar to step S402.

If it is determined that the RU position is valid in step S503 (YES in step S503), the processing proceeds to step S504. In step S504, processing for clearing the RU position is executed. In step S503, if it is determined that the RU position is not valid (NO in step S503), there is no need to perform the processing for clearing the RU position. Therefore, the formatting processing is completed without executing the processing for clearing the RU position.

In step S504, the system control circuit 50 executes the processing for clearing the RU position to delete the information about the RU position recorded on the register 210 of the recording medium 200 or to invalidate the information. Specifically, one of the following processes is executed:
(1) the Set Free AU command is issued (any AU may be designated);
(2) processing for writing data using a write command or the like is performed at any position in the AU including the acquired RU position; and
(3) processing for erasing data using an erase command or the like is performed at any position in the AU including the acquired RU position.

In the processing for clearing the RU position, only one of the above-described processes (1) to (3) may be executed, or two or all of the processes may be executed.

If one of the above-described processes (1) to (3) is executed, inconsistency occurs between the RU position held in the register 210 and the RU position where recording is started after the one of the processes (1) to (3) is executed. For this reason, the information about the RU position recorded on the register 210 in the recording medium 200 is cleared.

Thus, in the case of logical formatting, the processing of initialization of the system information in the management area 2021 (step S501) and the processing of clearing the RU position in the register 210 (step S504) are carried out. In the present exemplary embodiment, it is checked whether the RU position held in the register 210 is valid by the processing of steps S502 and S503, and the processing of clearing the RU position in step S504 is performed only when the RU position is valid. However, if the processing of steps S502 and S503 is not performed and logical formatting is performed, the processing of clearing the RU position in step S504 may be performed without fail.

In the case of physical formatting, in step S505, the system control circuit 50 initializes the management area 2021 in the same manner as in step S501, and initializes the data recording area 2022. In initializing the data recording area, an erase command is issued for all AUs in the data recording area 2022, and the entire data in the data recording area 2022 is erased. In this case, the data in AU including the RU position held in the register 210 is also erased by the erase command. Therefore, there is no need to execute the processing of clearing the RU position separately from the initialization processing. Thus, in the case of physical formatting, when the initialization of the management area 2021 and the initialization of the data recording area 2022 are executed, the formatting processing is completed.

As described above, during logical formatting, the processing of clearing the RU position stored in the register 210 is not carried out when only the initializing of the system information in the management area 2021 is executed. Accordingly, in the present exemplary embodiment, the processing of clearing the RU position is executed separately from the initialization processing. If the processing of clearing the RU position is not executed, after the logical formatting processing is executed, writing of data from the RU position in the AU is executed using the RU position set before the logical formatting processing. As a result, the data cannot be recorded on the RU which is a free area. For this reason, the processing of clearing the RU position is executed during logical formatting, and writing of data from an appropriate RU position in a desired AU within the data recording area 2022 is executed without using the RU position obtained before the logical formatting processing. Consequently, the data area of the recording medium 200 can be effectively used.

<Modified Example of RU Position Clear Processing>

As described above, in step S504, one of the processes (1) to (3) is performed to thereby generally make it possible to clear (invalidate) information about the RU position recorded on the register 210 of the recording medium 200. However, in some recording media, the processing cannot be performed properly and information about the RU position stored in the register 210 cannot be cleared even after one of the processes (1) to (3) is carried out. Accordingly, after the processing of clearing the RU position is executed in step S504, processing for clearing the RU position as illustrated in FIG. 6 may be further executed. A flowchart illustrated in FIG. 6 is implemented in such a manner that the system control circuit 50 of the image capturing apparatus reads a program according to an aspect of the present invention stored in the nonvolatile memory 56 into the memory 52, and performs arithmetic processing and controls each unit based on the read program.

First, in step S600, the system control circuit 50 transmits the ACMD 13 to the recording medium 200 and acquires information about the RU position held in the register 210 of the recording medium 200. Then, in step S601, the system control circuit 50 determines whether the RU position acquired in step S600 is valid. The processes of steps S600 and S601 are similar to the processes of steps S502 and S503, respectively.

Next, in step S602, the system control circuit 50 issues the Update DIR command to the recording medium 200. In step S603, the system control circuit 50 issues the Set Free AU command. In step S604, the system control circuit 50 issues the Start Rec command. The processes of steps S602, S603, and S604 correspond to the processes of steps S400, S404, and S405, respectively. These processes are executed to thereby enable writing of data in the VSC. In this case, since the logical formatting processing is performed, any location may be designated for each of the sector designated by the Update DIR command in step S603 and the AU designated by the Set Free AU command in step S603.

Thus, in a state where data writing in the VSC is enabled by the processing of steps S602 to S604, in step S605, the system control circuit 50 records the data on the AU, which is designated by the Set Free AU command, by using a write command. Thus, the processing of clearing the RU position is terminated.

As described above, in the processing illustrated in FIG. 6, the processing of clearing the RU position is executed by performing data writing processing based on the VSC after a new VSC is started. When a new VSC is started and data writing processing is performed on the newly started VSC, the status where data is recorded from the RU position held in the register 210 is to be eliminated. Therefore, by performing the data writing processing based on the VSC after a new VSC is started, the information about the RU position held in the register 210 can be reliably cleared in the recording medium 200.

In the flowchart described above, it is checked whether the RU position held in the register 210 is valid by the processing of steps S600 and S601, and the processing of clearing the RU position in steps S602 to S605 is performed only when the RU position is valid. However, if the processing of steps S600 and S601 is not carried out and logical formatting is performed, the processing of steps S602 to S605 may be performed without fail. Alternatively, the processing in the flowchart illustrated in FIG. 6 may be performed without performing the processing of step S504.

Preferred exemplary embodiments of the present invention have been described in detail above. However, the present invention is not limited to the specific exemplary embodiments, and various modes can be made without departing from the scope of the present invention. The exemplary embodiments described above are merely exemplary embodiments of the present invention, and the exemplary embodiments can be combined as appropriate.

While the exemplary embodiments described above illustrate an example in which the present invention is applied to an image capturing apparatus, the present invention is not limited to this example. Specifically, the present invention is also applicable to a mobile phone terminal, a mobile image viewer, a printer apparatus, a music player, a game console, an electronic book reader, and the like, which are connectable to the recording medium 200.

The above-described various control operations to be performed by the system control circuit 50 may be performed by one piece of hardware, or the control processing for the entire apparatus may be performed by a plurality of pieces of hardware.

(Other Exemplary Embodiments)

The present invention can also be implemented by executing the following processing. That is, the present invention can also be implemented in such a manner that software (program) for implementing the functions according to the exemplary embodiments described above is supplied to a system or an apparatus via a network or a storage medium, and one or more processors in the system or the apparatus read out the program and execute the program. In this case, the program and a recording medium storing the program constitute the present invention. The present invention can also be implemented by one or more circuits (e.g., application specific integrated circuits (ASICs)) for implementing the functions according to the exemplary embodiments described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-161162, filed Aug. 30, 2018, which is hereby incorporated by reference herein in its entirety.

What is claimed is:

1. A recording control apparatus that records data on a recording medium, the recording control apparatus comprising:

a position recording unit configured to perform control so that, upon completion of recording of data, a recording start position for next recording of data is recorded in a register on the recording medium, wherein the recording medium includes a data recording area for recording data, a management area for managing the data recording area, and the register; and a control unit;

wherein, the control unit of the recording control apparatus is configured to, when a user instructs logical formatting of the recording medium, execute first initialization processing of initializing the management area only and executes clear processing of clearing the recording start position from the register on the recording medium, and wherein, the control unit of the recording control apparatus is configured to, when the user instructs physical formatting, execute second initialization processing of initializing both the management area and the data recording area, without executing the clear processing.

2. The recording control apparatus according to claim 1, further comprising a recording control unit configured to control data to be recorded based on a predetermined speed class in which a recording speed is guaranteed for the recording medium by starting recording of data from a start position in a first unit, the recording medium being managed by the first unit and a second unit as a recording unit for recording data, the second unit being smaller than the first unit, wherein in the predetermined speed class, a position of the second unit included in the first unit is recorded on the recording medium as the recording start position, and wherein the recording control unit enables recording of data to be started from the recording start position corresponding to the second unit included in the first unit in the predetermined speed class by transmitting a predetermined command to start the recording from the recording start position recorded on the recording medium.

3. The recording control apparatus according to claim 2, wherein the recording medium is a memory card configured in conformity with secure digital (SD) standards, wherein the first unit is an allocation unit (AU) and the second unit is a recording unit (RU), and wherein the predetermined speed class is a video speed class.

4. The recording control apparatus according to claim 3, wherein the position recording unit transmits a Suspend AU command to the recording medium to record the recording start position on the recording medium, and wherein the recording control unit transmits a Resume AU command to the recording medium to start recording of data from the recording start position.

5. The recording control apparatus according to claim 2, wherein in the clear processing, the control unit uses a first command to notify the recording medium of a data recording area in the first unit in which data is to be recorded in the predetermined speed class.

6. The recording control apparatus according to claim 2, wherein in the clear processing, the control unit executes processing for recording data on a data recording area in the first unit including the recording start position.

7. The recording control apparatus according to claim 2, wherein in the clear processing, the control unit executes processing for erasing data in a data recording area of the first unit including the recording start position.

8. The recording control apparatus according to claim 2, wherein in the clear processing, the control unit executes processing for starting recording based on the predetermined speed class and then executes recording of data on a data recording area based on the predetermined speed class.

9. The recording control apparatus according to claim 5, wherein the control unit further executes processing for starting recording based on the predetermined speed class after executing the clear processing, and then controls recording of data on the data recording area to be executed based on the predetermined speed class.

10. The recording control apparatus according to claim 1, wherein the control unit acquires the recording start position from the recording medium after the first initialization processing is executed, and in a case where the acquired recording start position is valid information, the control unit controls the clear processing to be executed.

11. The recording control apparatus according to claim 10, wherein in a case where the acquired recording start position is not valid information, the control unit determines that the recording start position is not valid.

12. The recording control apparatus according to claim 2, wherein in a case where recording of data is started from a start position in the first unit without using the recording start position in the predetermined speed class, the recording control unit performs control in such a manner that the recording control unit notifies the recording medium of a data recording area in the first unit in which data is recorded by using a first command, and then transmits a second command for starting the recording in the predetermined speed class to the recording medium, and wherein in a case where recording of data is started from the recording start position in the predetermined speed class, the recording control unit performs control in such a manner that the recording control unit transmits a third command for starting the recording from the recording start position without transmitting the first command to the recording medium, and then transmits the second command to the recording medium.

13. The recording control apparatus according to claim 12, wherein the control unit performs control in such a manner that the control unit uses the first command to notify the recording medium of the data recording area in the first unit on which no data is recorded, as a data recording target.

14. A control method for a recording apparatus that records data on a recording medium, the control method comprising:
performing control so that a recording start position for next recording of data is recorded in a register on the recording medium after completion of recording of data,
wherein the recording medium includes a data recording area for recording data, a management area for managing the data recording area and the register; and
wherein, when logical formatting of the recording medium is instructed by a user, executing first initialization processing of initializing the management area only and executes clear processing of clearing the recording start position from the register on the recording medium, and
wherein, when physical formatting is instructed by the user, executing second initialization processing of initializing both the management area and the data recording area, without executing the clear processing.

15. A non-transitory computer-readable storage medium storing a program for causing a computer to execute a control method for a recording apparatus that records data on a recording medium, the control method comprising:
performing control so that a recording start position for next recording of data is recorded in a register on the recording medium after completion of recording of data,
wherein the recording medium includes a data recording area for recording data, a management area for managing the data recording area and the register; and
wherein, when logical formatting of the recording medium is instructed by a user, executing first initialization processing of initializing the management area only and executes clear processing of clearing the recording start position from the register on the recording medium, and
wherein, when physical formatting is instructed by the user, executing second initialization processing of initializing both the management area and the data recording area, without executing the clear processing.

* * * * *